United States Patent
Zhang et al.

(10) Patent No.: US 12,524,132 B2
(45) Date of Patent: Jan. 13, 2026

(54) SYSTEMS AND METHODS FOR DETECTING AND REGULARIZING DRIFT IN SEQUENTIAL DECISIONS

(71) Applicant: Toyota Research Institute, Inc., Los Altos, CA (US)

(72) Inventors: Yanxia Zhang, Foster City, CA (US); Shabnam Hakimi, Chapel Hill, NC (US); Matthew Klenk, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 18/506,446

(22) Filed: Nov. 10, 2023

(65) Prior Publication Data

US 2025/0157255 A1   May 15, 2025

(51) Int. Cl.
G06F 3/0482 (2013.01)
G06F 3/01 (2006.01)
G06Q 30/0601 (2023.01)
G06V 40/20 (2022.01)

(52) U.S. Cl.
CPC .......... G06F 3/0482 (2013.01); G06F 3/013 (2013.01); G06Q 30/0641 (2013.01); G06V 40/20 (2022.01)

(58) Field of Classification Search
CPC ... G06Q 30/0641; G06F 3/013; G06F 3/0482; G06V 40/20
See application file for complete search history.

(56) References Cited

U.S. PATENT DOCUMENTS

| 8,751,311 B2 | 6/2014 | Liu |
| 2008/0154738 A1 | 6/2008 | Jain et al. |
| 2015/0269534 A1 | 9/2015 | Sakata |
| 2020/0219135 A1* | 7/2020 | Hahn ............ G06F 3/013 |
| 2021/0208753 A1 | 7/2021 | Yu et al. |

FOREIGN PATENT DOCUMENTS

| CN | 102800006 B | 9/2016 |
| CN | 104008203 B | 4/2018 |
| WO | 2015029300 A1 | 3/2015 |

OTHER PUBLICATIONS

Danaf et al, "Online discrete choice models: Applications in personalized recommendations" (published at Decision Support Systems, vol. 119, pp. 35-45, Apr. 2019).*

* cited by examiner

Primary Examiner — Casey L Kretzer
(74) Attorney, Agent, or Firm — Dinsmore & Shohl LLP

(57) ABSTRACT

Embodiments of the present disclosure are directed to systems and methods to display a plurality of items in a spatial layout, monitor an eye gaze of the user while making sequential decisions about the plurality of items, determine that a drift has occurred, automatically regularize a plurality of alternative choice options, learn and identify an upper boundary and a lower boundary based on whether the user chooses or rejects at least one alternative choice, model the drift using machine learning based at least in part on a history of user decision responses, predict a drift direction of the drift and a relevance impact of different attributes into a drift state, classify the drift states into a risk-averse classification and a risk-seeking classification by clustering drift parameters over different behavioral measures to learn an attentive drift of the user, and output a desirable behavior model for machine learning.

20 Claims, 5 Drawing Sheets

SYSTEMS AND METHODS FOR DETECTING AND REGULARIZING DRIFT IN SEQUENTIAL DECISIONS

TECHNICAL FIELD

The present disclosure generally relates to detecting a drift while a user makes a decision and, more particularly, to systems and methods for regularizing choice options when the draft is detected.

BACKGROUND

Many decisions made in daily life are sequential in nature. These decisions, which evolve over time, are biased not only by the preceding choices, but also by the ever-changing environment in which they occur. Drift, which refers to fluctuations in the way that evidence is accumulated about choice options over time, is one form of bias on human decisions. Existing models generally ignore drift, assuming fixed environments and constant utility differences between choice options. As such, current models ignore drift and assume that the environment is fixed and that there are constant utility differences between choice options.

SUMMARY

In one embodiment, a system to identify drift in a dynamic context of real-world decision-making is provided. The system includes a user-computing device, at least one sensor, a processor, and a non-transitory, processor-readable storage medium. The at least one sensor is communicatively coupled to the user-computing device. The at least one sensor captures data as an input signal for a temporal drift. The non-transitory, processor-readable storage medium is in communication with the processor. The non-transitory, processor-readable storage medium includes one or more programming instructions that, when executed, cause the processor to display, on the user-computing device, a plurality of items in a spatial layout that a user may choose for a predetermined duration and at a predetermined frequency monitor, via the at least one sensor, an eye gaze of the user while making sequential decisions about the plurality of items, determine that a drift has occurred, and automatically regularize a plurality of alternative choice options when drift is detected. Further, the one or more programming instructions that, when executed, further cause the processor to learn and identify an upper boundary and a lower boundary based on whether the user chooses or rejects at least one alternative choice of the plurality of alternative choice options, model the drift using machine learning based at least in part on a history of user decision responses, predict a drift direction of the drift and a relevance impact of different attributes into a drift state, classify the drift states into a risk-averse classification and a risk-seeking classification by clustering drift parameters over different behavioral measures to learn an attentive drift of the user, and output a desirable behavior model for machine learning. The prediction of the drift states, the classifying of the drift states, and the modeling of the drift provide the data for training the desirable behavior model for machine learning.

In another embodiment, a method to identify drift in a dynamic context of real-world decision-making is provided. The method includes receiving, from a user-computing device, a search query from a user, determining, by a processor, whether a plurality of history drift data for the user is available, when the plurality of history drift data for the user is available, providing, by the processor, a plurality of items in a spatial layout that the user may choose for a predetermined duration and at a predetermined frequency, displaying, on the user-computing device, the plurality of items in the spatial layout for the predetermined duration and at the predetermined frequency and monitoring, by the processor via at least one sensor, an eye gaze of the user while making sequential decisions about the plurality of items. The method continues by determining, by the processor, that a drift has occurred, regularizing, by the processor, a plurality of alternative choice options when drift is detected, learning and identifying, by the processor, an upper boundary and a lower boundary based on whether the user chooses or rejects at least one alternative choice of the plurality of alternative choice options, modeling, by the processor, the drift using machine learning based at least in part on a history of user decision responses, predicting, by the processor, a drift direction of the drift and a relevance impact of different attributes into a drift state, classifying, by the processor, the drift states into a risk-averse classification and a risk-seeking classification by clustering drift parameters over different behavioral measures and outputting, by the processor, a desirable behavior model for machine learning.

In yet another embodiment, a system to identify drift in a dynamic context of real-world decision-making is provided. The system includes a user-computing device, at least one sensor, a processor, and a non-transitory, processor-readable storage medium. The at least one sensor is communicatively coupled to the user-computing device. The at least one sensor captures data as an input signal for a temporal drift. The non-transitory, processor-readable storage medium is in communication with the processor and includes one or more programming instructions that, when executed, cause the processor to receive a search query from a user, determine whether a plurality of history drift data for the user is available, when the plurality of history drift data for the user is available, provide a plurality of items in a spatial layout that the user may choose for a predetermined duration and at a predetermined frequency and output for display on the user-computing device a plurality of items in a spatial layout that the user may choose for a predetermined duration and at a predetermined frequency. The one or more programming instructions that, when executed, further cause the processor to monitor an eye gaze of the user while making sequential decisions about the plurality of items, determine that a drift has occurred, regularize a plurality of alternative choice options when drift is detected, learn and identify an upper boundary and a lower boundary based on whether the user chooses or rejects at least one alternative choice of the plurality of alternative choice options, model the drift using machine learning based at least in part on a history of user decision responses, predict a drift direction of the drift and a relevance impact of different attributes into a drift state, classify the drift states into a risk-averse classification and a risk-seeking classification by clustering drift parameters over different behavioral measures to learn an attentive drift of the user and output a desirable behavior model for machine learning. The prediction of the drift states, the classifying of the drift states, and the modeling of the drift provide the data for training the desirable behavior model for machine learning.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Embodiments of the present disclosure are directed to systems and methods to determine, detect, or account for drift effects inherent in choice processes to create more accurate models for a dynamic context of real-world decision-making. A user behavior is detected to determine drift, automatically regularize a plurality of alternative choice options when drift is detected such that these plurality of alternative choice options are displayed for the user, learn and identify an upper boundary and a lower boundary based on whether the user chooses or rejects at least one alternative choice of the plurality of alternative choice options and model the drift using machine learning techniques based at least in part on a history of user decision responses.

Further, the systems and methods may also predict a drift direction of the drift and a relevance impact of different attributes into a drift state, classify the drift states into a risk-averse classification and a risk-seeking classification by clustering drift parameters over different behavioral measures to learn an attentive drift of the user and output a desirable behavior model for machine learning. Conventionally, models ignore drift and assume that the environment is fixed and that there are constant utility differences between choice options. As such, the disclosed systems and methods employ a novel or unconventional approach to learn dynamic utility representations and contextual attributes by detecting drift while users make sequential decisions and then automatically regularizes choice options when drift is detected.

Various systems and methods for identifying drift and regularizing choice options when drift is detected are described in detail herein.

Figure 1:
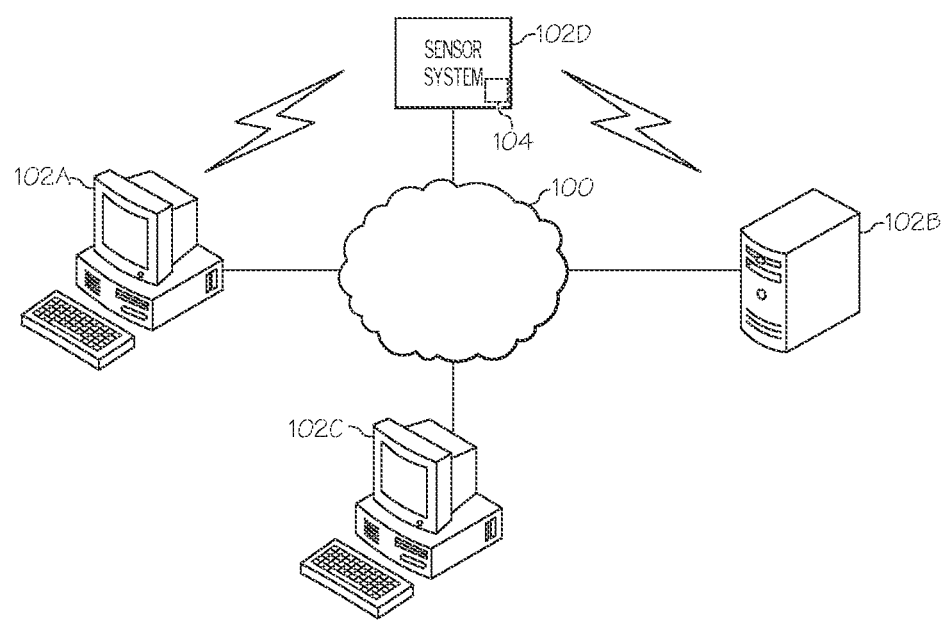
FIG. 1 schematically depicts an illustrative computing network for a system for identifying drift in a dynamic context of real-world decision-making according to one or more embodiments described and illustrated herein.

Referring now to the drawings, FIG. 1 depicts an illustrative computing network that depicts components for a system for identifying drift in a dynamic context of real-world decision-making, according to embodiments shown and described herein. Drift, which may refer to fluctuations in the way that evidence is accumulated about choice options over time, is one form of bias on human decisions.

As illustrated in FIG. 1, a computer network 100 may include a wide area network (WAN), such as the internet, a local area network (LAN), a mobile communications network, a public service telephone network (PSTN) a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user-computing device 102a, a drift identifying device 102b, an administrator computing device 102c and/or a sensor system 102d.

The user-computing device 102a may generally provide an interface between a user and the other components connected to the computer network 100. Thus, the user-computing device 102a may be used to perform one or more user-facing functions, such as receiving one or more inputs from a user or transmitting data or information such as data related to initiating an electronic search query for one or more products. More specifically, to perform an electronic search query, the user-computing device 102a may present a user with a user interface that allows the user to review products, alternative choices, and the like. The user interface may be configured to receive a search request from the user, initiate the search, and utilize data received from the drift identifying device 102b when displaying search results or alternative results, as described in greater detail herein. The search request may include various desired products and alternative choices to those desired products within a predetermined upper and lower boundary, and/or other data, as discussed in greater detail herein. The components and functionality of the user-computing device 102a will be set forth in detail below.

Additionally, included in FIG. 1 is the administrator computing device 102c. In the event that the drift identifying device 102b requires oversight, updating, or correction, the administrator computing device 102c may be configured to provide the desired oversight, updating, and/or correction. The administrator computing device 102c may also be used to input additional data into a data storage portion of the drift identifying device 102b. For example, the administrator computing device 102c may update or change algorithms such as machine learning models, set upper and lower boundaries for alternative product choices, and the like.

Figure 3:
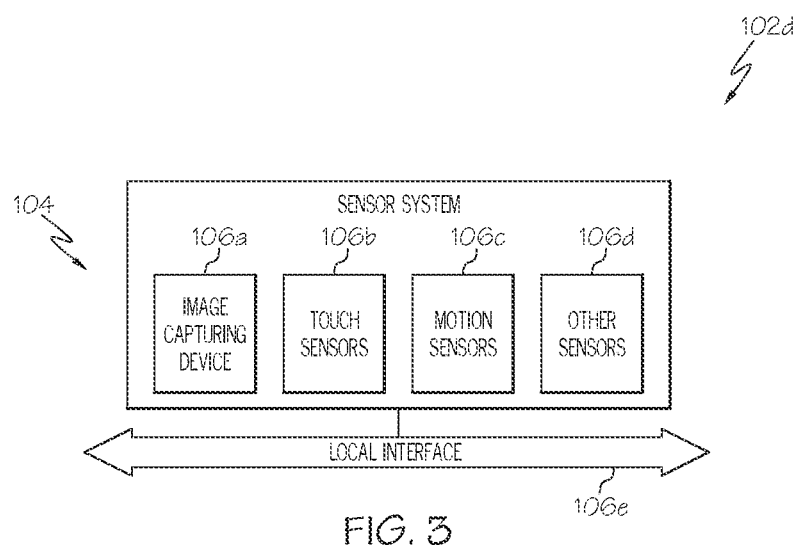
FIG. 3 schematically depicts a sensor system from FIG. 1, further illustrating hardware and software components that may be used to detect behaviors of a user using the user-computing device of FIG. 2B according to one or more embodiments described and illustrated herein.

Further, included in FIG. 1 and also referring to FIG. 3, the sensor system 102d is schematically depicted, which may include at least one sensor 104. The at least one sensor 104 may be configured to capture data as an input signal for identifying a temporal drift of the user. As such, the at least one sensor 104 may be an image capturing device 106a, a touch sensor 106b, a motion sensor 106c, and/or an alternative sensor 106d and a local interface 106e. The local interface 106e may be used to communicatively couple the image capturing device 106a, the touch sensor 106b, the motion sensor 106c, and/or the alternative sensor 106d to one another and also to external devices (e.g., the user-computing device 102a, the drift identifying device 102b, and/or the like, illustrated by lightning bolts in FIG. 1). In some embodiments, the at least one sensor 104 may be one or more of these devices, in combination with other sensing devices, and/or the like.

The image capturing device 106a may capture images in real-time and may be any imaging device, sensor, or detector that is suitable for obtaining images. That is, the image capturing device 106a may incorporate one or more image sensors, one or more image processors, one or more optical elements, and/or the like. In some embodiments, the image capturing device 106a may capture high dynamic range (HDR) images. In some embodiments, the image capturing device 106a may capture a plurality of images successively (e.g., "burst mode" capture), may capture single images at particular intervals, and/or may capture motion images (e.g., video capture). That is, as used herein, the term "images" or "image" refers to video images (i.e., a sequence of consecutive images), still images (including still images isolated from video images), and/or image data.

In some embodiments, images are continuously captured and analyzed. In other embodiments, images are captured at particular intervals, illustrative intervals may include, but are not limited to, time intervals such as every second, every 2 seconds, every 3 seconds, every 4 seconds, every minute, every 2 minutes, every 5 minutes, every 30 minutes, every hour, or the like. In addition to capturing images, the image capturing device 106a may record information regarding the image capture, such as, for example, a time stamp of when the image was captured, a frame rate, a field of view, a gaze of the user, and/or the like. Each captured image and the recorded information may be transmitted as image data to the drift identifying device 102b.

That is, the image capturing device 106a may be configured to determine the gaze of the user of the user-computing device 102a and may be a sensor or other device that incorporates one or more image sensors, one or more image processors, one or more optical elements, and/or the like. The image capturing device 106a may be configured to determine the gaze of the user of the user-computing device 102a may generally be used to sense the movement or gaze of the eyes and/or pupils of the user of the user-computing device 102a so as to provide feedback during operation. As such, the image capturing device 106a configured to determine, sense, and/or detect the gaze of the user may be communicatively coupled to user-computing device 102a, the drift identifying device 102b, and/or other components of the computer network 100.

As such, the image capturing device 106a, the user-computing device 102a, the sensor system 102d, and/or other components of the computer network 100 transmit a plurality of outputs, either wired or wirelessly, to the drift identifying device 102b, as explained in greater detail herein. For example, the image capturing device 106a and/or other components of the computer network 100 may track the user gaze such as moving his or her gaze up or down as he or she looks at products or choices, alternative products or choices, and/or the like, as well as track a direction of the gaze of the user. In other embodiments, the at least one sensor 104 configured to determine the gaze of the user may not be the image capturing device 106a, but may be a laser-based sensor, a proximity sensor, a level detection sensor, a pressure sensor, any combination thereof, and/or any other type of sensor that one skilled in the art may appreciate.

In some embodiments, the image capturing device 106a may be capable of focusing on a target object, zooming in and out, and/or moving, such as, for example, panning, tilting, and/or the like. In some embodiments, the image capturing device 106a may be capable of tracking a moving object, such as, for example, the eyes or head of the user, and/or the like. As such, the image capturing device 106a may incorporate various motion sensing and/or tracking components, software, and/or the like that are generally understood as providing tracking capabilities.

Further, the image capturing device 106a may include or may be coupled to a lens. The lens is not limited by this disclosure and may generally be any optical component that is configured to focus the light entering the image capturing device 106a such that an image can be properly obtained. In some embodiments, the lens may be a fixed lens that is not adjustable. In other embodiments, the lens may be adjustable, either manually or automatically by the drift identifying device 102b, to zoom in on an object, zoom out on an object, and/or adjust the focus of the light entering the image capturing device 106a.

Any suitable commercially available image capturing device 106a may be used without departing from the scope of the present disclosure. In some embodiments, the image capturing device 106a may also be coupled to one or more other components that provide additional functionality for imaging, such as, for example, one or more sensors. Further, the image capturing device 106a may include more than one imaging capturing device.

The touch sensor 106b may be configured to sense any touching by the user onto or with the user-computing device 102a and transmit data related to the touch, movement, and choices by the user to learn an attentive drift. For example, the touch sensor 106b may be configured to sense or detect a plurality of touch indicators such as the user making contact with a touch screen display of the user-computing device 102a. It should be appreciated that the touch sensor 106b may be one sensor or a plurality of sensors that are configured to sense or detect any touch inputs generated by the user with, from, or by any component of the computer network 100.

The motion sensor 106c may be configured to sense any movement of various peripheral devices used by the user and transmit data related to the touch, movement, and choices by the user to learn an attentive drift. For example, the motion sensor 106c may be configured to sense or detect a plurality of mouse movements associated with the user-computing device 102a to learn the attentive drift of the user. It should be appreciated that the motion sensor 106c may be one sensor or a plurality of sensors that are configured to sense or detect any movement inputs generated by the user with, from, or by any component of the computer network 100.

Figure 2A:
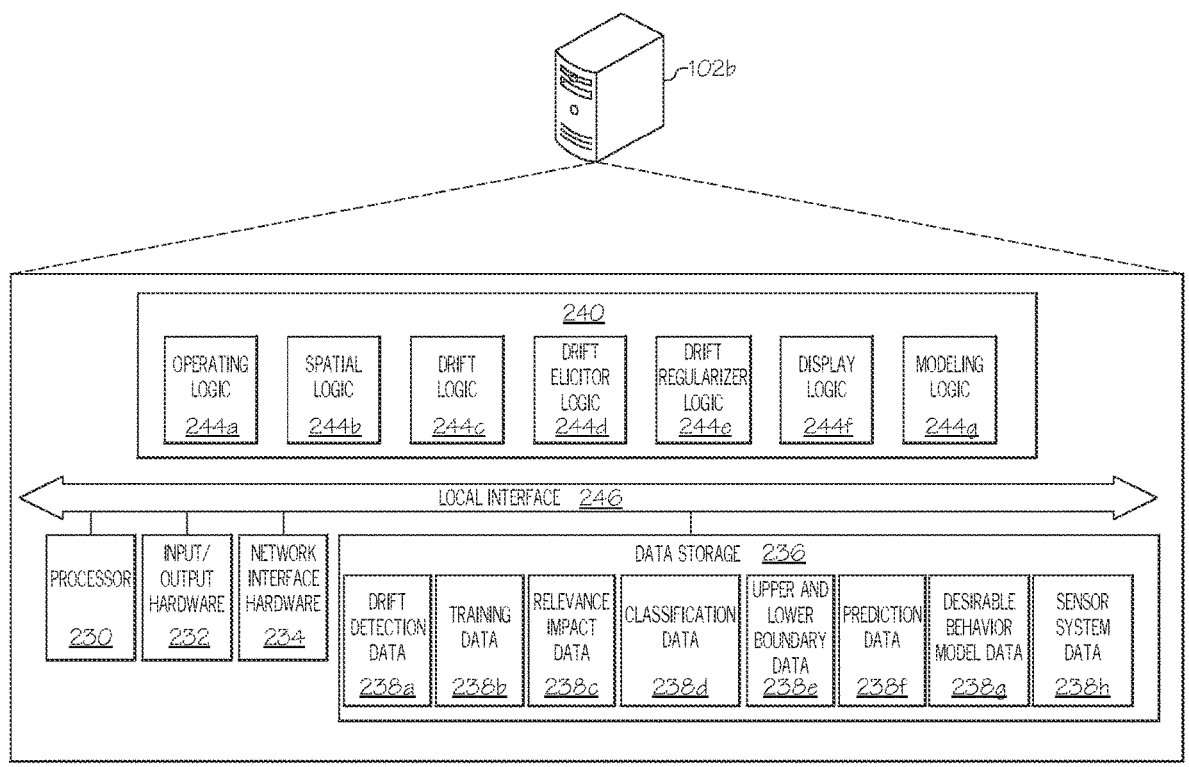
FIG. 2A schematically depicts a drift identifying device from FIG. 1, further illustrating hardware and software components that may be used to detect or account for drift effects inherent in choice processes to create more accurate models for the dynamic context of real-world decision-making according to one or more embodiments described and illustrated herein.
Figure 2B:
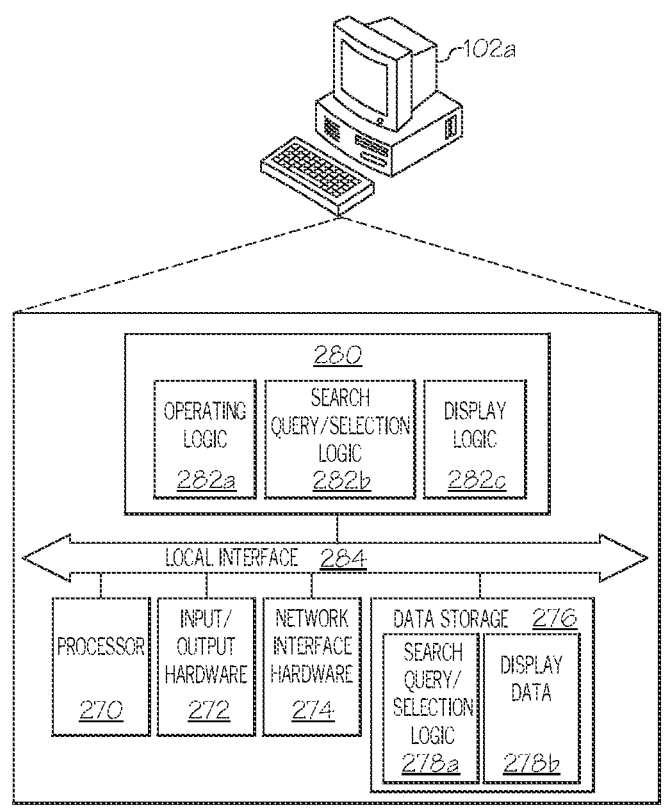
FIG. 2B schematically depicts the user-computing device from FIG. 1, further illustrating hardware and software components that may be used to initiated a search query and display specific data according to one or more embodiments described and illustrated herein.

In some embodiments, the sensor system 102d may be communicatively coupled to, or use components of the user-computing device 102a (e.g., a processor 270, a data storage component 276, and/or a memory component 280, as depicted in FIG. 2B) and the user-computing device 102a may transmit the captured data to the drift identifying device 102b.

In other embodiments, the sensor system 102d may be communicatively coupled to, or use components of the drift identifying device 102b (e.g., a processor 230, a data storage component 236, and/or a memory component 240, as depicted in FIG. 2A) and each of the sensors within the sensor system 102d may transmit the captured data to the drift identifying device 102b.

In other embodiments, the sensor system 102d itself may include additional components such as an electronic control unit or a central processing unit (e.g., a processor, a data storage device, and/or a memory device) and the electronic control unit or a central processing unit may receive data from each of the sensors within the sensor system 102*d* may transmit the captured data to the drift identifying device 102*b*, and/or other components of the computer network 100.

Further, the sensor system 102*d* may include other sensors such as laser sensors, proximately sensors, additional or specialized gaze sensors, and/or the like.

The drift identifying device 102*b* may monitor a user of the user-computing device 102*a* via the sensor system 102*d* while the user is making sequential decisions about a plurality of items or products that are displayed on the user-computing device 102*a* and then determine whether a drift has occurred based on the monitored data. The drift identifying device 102*b* may also automatically regularize a plurality of alternative choice options when drift is detected such that these plurality of alternative choice options are displayed for the user on the user-computing device 102*a*, learn and identify an upper boundary and a lower boundary based on whether the user chooses or rejects at least one alternative choice of the plurality of alternative choice options and model the drift using machine learning techniques based at least in part on a history of user decision responses.

The drift identifying device 102*b* may also predict a drift direction of the drift and a relevance impact of different attributes into a drift state, classify the drift states into a risk-averse classification and a risk-seeking classification by clustering drift parameters over different behavioral measures to learn an attentive drift of the user and output a desirable behavior model for machine learning. The drift identifying device 102*b* may use the predictions of the drift states, the classifying of the drift states, and the modeling of the drift to provide the data for training the desirable behavior model for machine learning. Examples of the machine learning techniques may include convolutional neural networks, recurrent neural networks Gaussian process, and/or the like.

As such, the drift identifying device 102*b* may also transmit information to the user-computing device 102*a* such that the user-computing device 102*a* may display the alternative choices, may display different products or items in different order, in a different part of the display screen, how the long particular items or items are displayed, and/or the like. The drift identifying device 102*b* may provide or transmit data to an external device, such as the user-computing device 102*a*, to display information for determining the drift based on sensed behavioral measures or metrics. The components and functionality of the drift identifying device 102*b* will be set forth in detail below.

It should be understood that while the user-computing device 102*a* and the administrator computing device 102*c* are depicted as personal computers and the drift identifying device 102*b* is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user-computing device 102*a*, the drift identifying device 102*b*, and the administrator computing device 102*c* may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

FIG. 2A depicts the drift identifying device 102*b*, further illustrating a system that a system for identifying drift in a dynamic context of real-world decision-making by utilizing hardware, software, and/or firmware, according to embodiments shown and described herein. The drift identifying device 102*b* may include a non-transitory, computer readable medium configured for monitoring various movements and/or gaze of a user and determining whether a drift has occurred embodied as hardware, software, and/or firmware, according to embodiments shown and described herein.

While in some embodiments, the drift identifying device 102*b* may be configured as a general purpose computer with the requisite hardware, software, and/or firmware, in other embodiments, the drift identifying device 102*b* may be configured as a special purpose computer designed specifically for performing the functionality described herein. For example, the drift identifying device 102*b* may be a specialized device that particularly determines whether a drift has occurred in a user's decision making and a relevance impact of different attributes into a drift state, classifying the drift states into a risk-averse classification and a risk-seeking classification by clustering drift parameters over different behavioral measures and outputting a desirable behavior model for machine learning. In a further example, the drift identifying device 102*b* may be a specialized device that further provides a plurality of default set of choice questions; and prompts the plurality of default set of choice questions for the user to select options therefrom, to simulate decision outcomes.

The drift identifying device 102*b* then uses the data to model, via machine learning, to automatically regularize choice options when the drift is detected and provide the choice options to the user via an external component (e.g., the user-computing device 102*a* (FIG. 1)) for the purposes of improving decisions by eliminating bias in a dynamic environment by taking into account the drift effects inherent in choice processes to create more accurate models for the dynamic context of real-world decision-making.

As also illustrated in FIG. 2A, the drift identifying device 102*b* may include a processor 230, input/output hardware 232, network interface hardware 234, a data storage component 236, which stores a database of drift detection data 238*a*, training data 238*b*, relevance impact data 238*c*, classification data 238*d*, upper and lower boundary data 238*e*, prediction data 238*f*, desirable behavior model data 238*g*, and sensor system data 238*h*, and a memory component 240. The memory component 240 may be non-transitory computer readable memory. The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 244*a*, spatial logic 244*b*, drift logic 244*c*, drift elicitor logic 244*d*, drift regularizer logic 244*e*, display logic 244*f*, and modeling logic 244*g* (each of which may be embodied as a computer program, firmware, or hardware, as an example). A local interface 246 is also included in FIG. 2A and may be implemented as a bus or other interface to facilitate communication among the components of the drift identifying device 102b.

The processor 230 may include any processing component(s) configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the drift identifying device 102b and may be configured to store one or more pieces of data for access by the drift identifying device 102b and/or other components. As illustrated in FIG. 2A, the data storage component 236 stores a database of drift detection data 238a. As mentioned above, the drift detection data 238a may be any data that is utilized to identify drift of a user when making sequential decisions. For example, data may include, without limitation, information from cameras, touch sensors, motion sensors, or other types of sensors to learn the attention drift of a user. In one example, image capturing devices may be able to monitor the eye gaze for fixations on a particular choice, mouse movements, such as mouse clicks or hovering time, or touch for learning attention drift. Sequential decisions may be decisions made in an order. The training data 238b may store data that is used to train the machine learning and other data for the models and may include previously observed sequence of users' decision responses.

The relevance impact data 238c may include data related to predictions of the covariance of different attributes. That is, the relevance impact data 238c may include data relating to the prediction or measurement of the relationship between variables, such as, without limitation, various products displayed, spatial layout relationships, choices or non-choices, and/or the like. The classification data 238d may include data relating to whether the various drift states are classified as either risk-averse or risk-seeking. The upper and lower boundary data 238e may include data related to whether the user chooses or rejects alternative choices, such as, whether to purchase or not to purchase a particular item. The prediction data 238f may include data related to predicting a drift direction such as gradient changes in mean values. For example, the prediction data 238f may include data relating to the multiple inputs of data used in the modeling and may include calculated data, such as derivatives of inputs. The desirable behavior model data 238g may include data relating to different behavioral measures, such as, without limitation, a plurality of mouse clicks and a plurality of gaze data or patterns that are desirable to indicate that the user has either experienced bias or detects biases and/or that there is no bias and/or no drift has occurred.

The sensor system data 238h may include data relating to detected or sensed data from the sensor system 102d (FIG. 1). Example data may include, without limitation, eye gaze, touch, motion, and the like. As such, the sensor system data 238h may include any data captured, detected, or otherwise gathered from the image capturing device 106a, the touch sensor 106b, the motion sensor 106c, and/or the alternative sensor 106d illustrated in FIG. 3.

Included in the memory component 240 are the operating logic 244a, spatial logic 244b, drift logic 244c, drift elicitor logic 244d, drift regularizer logic 244e, display logic 244f, and modeling logic 244g. The operating logic 244a may include an operating system and/or other software for managing components of the drift identifying device 102b. The spatial logic 244b may contain programming instructions to facilitate different displays of data such as items or products on a display or graphic user interface, changing duration or order, changing positioning of the display of the items or products, and the like. The spatial logic 244b may transmit data to the device of the user (i.e., the user-computing device 102a) so that the device knows which products to display, in what order, duration, and the like, as discussed in greater detail herein. As such, the device computer (i.e., the user-computing device 102a) has information that triggers the search computer to move or change the display, the spatial layout of the items that can be chosen by the user and the duration of frequency of the displayed items can be used as an input signal for temporal drift.

The drift logic 244c may contain programming instructions to learn a drift function and identify upper and lower boundaries where the decision-maker chooses or rejects alternative choices. As such, the upper and lower boundaries may be a calculation (e.g., line, surface, and the like) learned from the data gathered from the decision-maker choices. Examples of these alternative choices can include things such as to purchase or not to purchase a particular item. Machine learning models may be used that do not make assumptions on the underlying functions. Examples of these models can include recurrent neural networks Gaussian process to model drift in the user's utility function. In one example, the programming instruction may utilize additive Gaussian terms of drift signals from a plurality of sources. The Gaussian terms will choose different kernels according to the type of input data.

The drift logic 244c may contain programming instructions configured to use information from the plurality of sources, such as, the sensor system 102d (FIG. 1) that detects or sensed movements and/or responses of the user. Example information or data may include, without limitation, data from image capturing device, touch sensors, motion sensors, or other types of sensors to learn the attention drift of a user. In one example, image capturing device 106a may be configured to monitor the eye gaze for fixations on a particular choice, mouse movements, such as mouse clicks or hovering time, or touch for learning attention drift.

The drift elicitor logic 244d may contain programming instructions configured to prompt a user to select options from a set of choice questions. The drift elicitor logic 244d may be utilized when there is little to no prior user data available. The default choices of no drift may be simulated decision outcomes by assuming a constant utility difference between alternatives. Further, in some embodiments, the drift elicitor logic 244d may be a model that is first pre-trained with the elicited choice responses and then fine-tuned with incoming decision data. The drift regularizer logic 244e may contain programming instructions configured to dynamically regularize how and when to present choice options (e.g., spatial layout, order, frequency, and the like) once the drift state is detected. For example, in product purchase scenarios, if drift is detected towards items listed on one side, the drift regularizer logic 244c may swap items on left/right or top/bottom. Alternatively, the drift regularizer logic 244c may be configured to place a highlight icon in the middle to bring the user's attention back to the center.

Another use case may be to adjust the duration and frequency of presented items. For example, in recommendation systems, when the user is presented with a series of item collections (e.g., movie bundles), the durations will be automatically adjusted to eliminate drift towards either choice options or placing blank placeholders therebetween.

The display logic 244f may contain programming instructions configured to provide data and/or instructions for displaying items on a graphical user interface usable by the user of the user-computing device 102a. The modeling logic 244g may contain programming instructions configured to use machine learning techniques to model data. For example, the modeling logic 244g may classify drift states into risk-averse and risk-seeking by clustering drift parameters over different behavioral measures, such as mouse clicks and gaze patterns. That is, the risk-averse and risk-seeking categories may be predetermined and defined by various decision making theories and behaviors. For example, and without limitation, when people make sequential decisions under uncertainties, these two states can be: people may continue gambling for more rewards, but risk of losing everything (risk-seeking) or people may decide to cash out (risk-averse). As such, the modeling logic 244g may use programming instructions configured to use machine learning techniques to detect and classify behavior into risk-averse and risk-seeking categories.

The modeling logic 244g may further utilize machine learning models that do not make assumptions on the underlying functions. Examples of these models may include, without limitation, recurrent neural networks Gaussian process to model drift in the user's utility function. In one example, the modeling logic 244g may be implemented by additive Gaussian terms of drift signals and the Gaussian terms will choose different kernels according to the type of input data.

It should be understood that the components depicted in FIG. 2A are merely illustrative and are not intended to limit the scope of this disclosure. More specifically, while the components in FIG. 2A are illustrated as residing within the drift identifying device 102b, this is a nonlimiting example. In some embodiments, one or more of the components may reside external to the drift identifying device 102b. Similarly, while FIG. 2A is directed to the drift identifying device 102b, other components such as the user-computing device 102a and the administrator computing device 102c may include similar hardware, software, and/or firmware.

FIG. 2B depicts the user-computing device 102a further illustrating a system that identifies a search query or user selections by utilizing hardware, software, and/or firmware, according to embodiments shown and described herein. In addition, the user-computing device 102a may include a non-transitory, computer readable medium configured for displaying and transmitting a search query and/or selections initiated by a user embodied as hardware, software, and/or firmware, according to embodiments shown and described herein.

While, in some embodiments, the user-computing device 102a may be configured as a general purpose computer with the requisite hardware, software, and/or firmware, in other embodiments, the user-computing device 102a may be configured as a special purpose computer designed specifically for performing the functionality described herein. For example, the user-computing device 102a may be a specialized device that displays a user interface for inputting a search query and/or for selecting various items or products to eliminate or reduce user drift for the purposes of improving the accuracy of the user choices, removing biases, or otherwise improve user choices.

As also illustrated in FIG. 2B, the user-computing device 102a may include a processor 270, input/output hardware 272, network interface hardware 274, data storage component 276, which stores a database of search query/selection data 278a and display data 278b, and a memory component 280. The memory component 280 may be non-transitory computer readable memory. The memory component 280 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 280 may be configured to store operating logic 282a, search query/selection logic 282b, and display logic 282c (each of which may be embodied as a computer program, firmware, or hardware, as an example). A local interface 284 is also included in FIG. 2B and may be implemented as a bus or other interface to facilitate communication among the components of the user-computing device 102a.

The processor 270 may include any processing component(s) configured to receive and execute instructions (such as from the data storage component 276 and/or memory component 280). The input/output hardware 272 may include a monitor, keyboard, mouse, printer, camera, microphone, speaker, and/or other device for receiving, sending, and/or presenting data. The network interface hardware 274 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 276 may reside local to and/or remote from the user-computing device 102a and may be configured to store one or more pieces of data for access by the user-computing device 102a and/or other components, store data that may be received from an external device (e.g., the drift identifying device 102b) such as the search query/selection data 278a, and/or store data to be displayed. As illustrated in FIG. 2B, the data storage component 276 stores a database of search query/selection data 278a. As mentioned above, the search query/selection data 278a may include data related to a searched product or item, user selections or choices, and the like, and/or data received from an external device (i.e., the drift identifying device 102b). The display data 278b may include data relating to the data to be displayed. For instance, the display data 278b may include the order or otherwise distinguished or moved choices, duration, spatial relationship, and the like to be displayed on the user-computing device 102a, as instructed, such as from the drift identifying device 102b.

Included in the memory component 280 are the operating logic 282a, search query/selection logic 282b, and display logic 282c. The operating logic 282a may include an operating system and/or other software for managing components of the user-computing device 102a. The search query/selection logic 282b may contain programming instructions to facilitate user initiated electronic searches or queries or capture user selections of various items, products, indices, and the like. The search query/selection logic 282b may be configured to compile, organize, and/or display user choices and other data into an order, such as rearranging or moving a plurality of choices to reduce or eliminate a predisposition of the user to always select the choice from one particular area of the display. The search query/selection logic 282b may also be configured to provide data for a user interface to or a display device of the user-computing device 102a.

The display logic 282c may display a graphical user interface usable by a user of the user-computing device 102a to provide search queries, to display visualizations of a plurality of metadata associated with the plurality of user selections, and to change or rearrange the display of the plurality of user choices and the result of the metadata associated with the selected user choice. The display logic 282c may generally be configured to display information on a display of the user-computing device 102a. The functionalities of the operating logic 282a, the search query/selection logic 282b, and the display logic 282c will be described in further detail below.

It should be understood that the components depicted in FIG. 2B are merely illustrative and are not intended to limit the scope of this disclosure. More specifically, while the components in FIG. 2B are illustrated as residing within the user-computing device 102a, this is a nonlimiting example. In some embodiments, one or more of the components may reside external to the user-computing device 102a. Similarly, while FIG. 2B is directed to the user-computing device 102a, other components such as the administrator computing device 102c may include similar hardware, software, and/or firmware.

Figure 4:
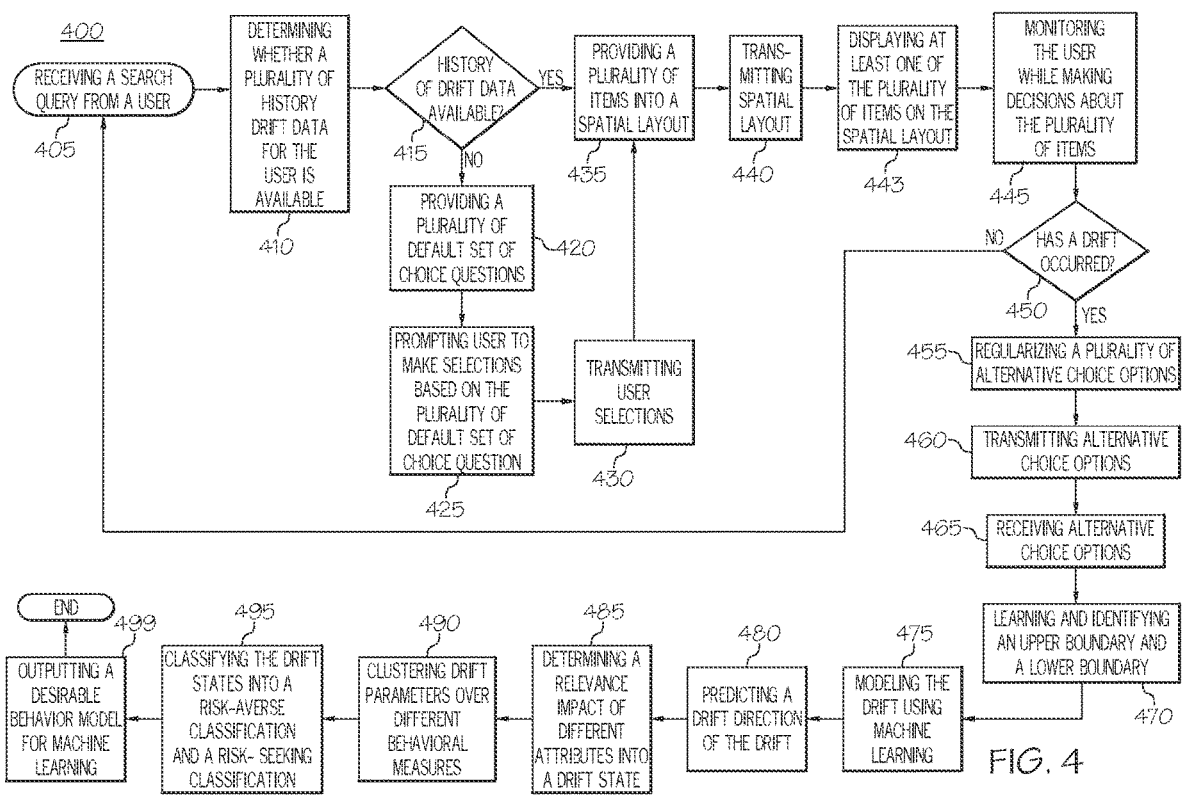
FIG. 4 depicts a flow diagram of an illustrative method of facilitating a drift determination and drift effects inherent in choice processes to generate models for the dynamic context of real-world decision making according to one or more embodiments shown and described herein.

Referring now to FIG. 4, a flow diagram that graphically depicts an illustrative method 400 of facilitating a drift determination and drift effects inherent in choice processes to generate improved models for the dynamic context of real-world decision making is provided. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

Still referring to FIG. 4, at block 402, the user-computing device 102a (FIG. 1) may receive a search query or other input from the user. In response, at block 410, the search query or other input from the user may be transmitted to the drift identifying device 102b to determine whether a plurality of history draft data for the user is available. At block 415, the drift identifying device 102b determines whether there is a history of draft data available. When there is not a history of drift data available, the drift identifying device 102b may provide a plurality of default set choice question to the user-computing device 102a, at block 420, for display by the user-computing device 102a. At block 425, the user-computing device 102a prompts the user to make selections based on the plurality of default set of choice questions. At block 430, the user selections are transmitted to the drift identifying device 102b.

At block 435, if there is a history of drift data available from the determination at block 415, or based on the user selections transmitted at block 430, the drift identifying device 102b provides a plurality of items into a spatial layout. As such, the history of drift data available and/or the user selections are used as training data for the models. The spatial layout of the items that may be chosen by the user and the duration of frequency, order, and/or layout of the displayed items can be used as an input signal for temporal drift. As such, at block 440, the drift identifying device 102b transmits the spatial layout data to the user-computing device 102a, and in response, the user-computing device 102a, at block 443, displays at least one of the plurality of items as directed by the spatial layout.

Once displayed, the sensor system 102d monitors the user while making decisions about the plurality of items, at block 445. It should be appreciated that the monitoring may be by monitoring an eye gaze of the user, various touch or motions made by the user, such as mouse clicks, mouse positioning, and the like. The data is transmitted from the sensor system 102d either directly to the drift identifying device 102b by the sensor system 102d and/or to the drift identifying device 102b from the sensor system 102d via the user-computing device 102a. At block 450, based on the received monitoring data of the user, the drift identifying device 102b determines whether a draft has occurred. If no drift has occurred, then the process returns to block 405 to begin again. As such, the process may continually loop between blocks 405-450 until a drift detection has occurred.

When the drift has occurred at block 450, the drift identifying device 102b may regularize a plurality of alternate choices options, at block 455. For example, once drift has occurred, the drift identifying device 102b may dynamically regularize how and when to present choice options (spatial layout, order, frequency), such as, in a non-limiting product purchase example, if drift is detected towards items listed on one side, the items on left/right or top/bottom may be swapped. Alternatively, in another non-limiting example, a highlight icon may be added to the display, such as in the middle, to bring the users attention back to the center of the display. Another non-limiting example may be to adjust the duration and frequency of presented items. For example, in recommendation systems, when the user is presented with a series of item collections (e.g., movies bundles), the durations may be automatically adjusted to eliminate drift towards either choice options or placing blank placeholders between.

At block 460, at least one of the plurality of alternate choices options are transmitted to the user-computing device 102a, which display the plurality of alternate choices options. At block 465, the plurality of alternate choices options selected by the user are received. Non-limiting examples of these alternative choices may include whether the user selected to purchase or not to purchase a particular item, whether the user appeared receptive to the alternative choice based on various behaviors sensed by the sensing system (e.g., mouse clicks, hovering, gaze, and the like). At block 470, the drift identifying device 102b learns and identifies upper/lower boundaries where the decision-maker chooses or rejects the alternative choices. The drift detector uses machine learning models, at block 475, to model the drift. The machine learning models do not make assumptions on the underlying functions. Non-limiting examples of these models may include recurrent neural networks Gaussian process to model drift in the user's utility function. As such, the machine learning models may be implemented by additive Gaussian terms of drift signals from a variety of sources in which the Gaussian terms will choose different kernels according to the type of input data.

At block 480, the drift identifying device 102b predicts the drift direction (e.g., gradient changes in mean values) and, at block 485, determines a relevance impact (e.g., covariance) of different attributes into at least one of a plurality of drift states. At block 490, the determined drift states are clustered over different behavioral measures, such as, without limitation, mouse clicks and gaze patterns. At block 495, the model classifies the clustered drift states into a risk-averse classification or a risk-seeking classification. At block 499, the drift identifying device 102b outputs a desirable behavior model for machine learning.

The desirable behavior model for machine learning may include changing spatial/temporal visual displays through improving the display or graphic user interface of the user to optimize user decision making in order to overcome bias. That is, the output may contain data to dynamically regularize how and when to present choice options (spatial layout, order, frequency). For example, particular screens, items, graphic user interfaces, and the like, may be changed or swap such as changing left to right or top to bottom. Alternatively or additionally, output may highlight displays, features, or other items or icons such as moving to the middle and providing various emphases or highlighting (e.g., flashing, change colors, and/or the like) in the middle of the display to bring the user's attention back to the center of the display. Further, the output data may adjust the duration and frequency of presented or displayed data, such as particular screens, items, graphic user interfaces, icons, and the like.

In some embodiments, the output of the desirable behavior model may also label different options explicitly into 'safe choice' for options that have a high probability of success and 'risky choice' for options with a low probability of success. As such, higher drift rates reflect that a user is easier to be biased in sequential choices. Such modeling and data permits third parties to machine learning algorithms, as discussed herein, to target users or groups with detected high drift rate to make campaign or ads more effective to nudge users towards a certain type of choice.

For example, in cases where the correct choices known, in a manufacturing setting, the user may be required to make one correct choice. However, because of drift detected, the user may not consistently make the correct choice. The output at block 499 may rearrange or highlight the correct (or at least better) choices to eliminate or reduce drift. As such, the method 400 may detect user biases based on the placement of choices such that the choices may be rearranged to reduce or eliminate bias. For example, the user may have a predisposition to select the choice in the upper left-hand corner of the screen. By rearranging the choices, the user may be forced to consider choices more carefully.

As such, the systems and methods described herein provides improvements in computer functionality by improving or changing graphical user interfaces such that particular icons, items, or other displayed data may be moved, arranged, highlighted, or distinguished from other choices once drift is detected. Further, the output data causes an external device, such as the user-computing device 102*a* to move, arrange, highlight, or otherwise distinguish certain display data (e.g., icons, items, products, interfaces, searches, confirmations, and the like) as the result of the drift detection. Additionally, the output data is different or changed from the input data to filter or change data that is output to the external device, such as the user-computing device 102*a*. Further, the system and method described herein limits data changes or collection to when drift has occurred, which avoids unnecessary data collection, changing of data or displaying, and the like.

Further, the system and method described herein provides improvements in decision making technological fields by transforming certain input data into a different output data that may be based on a user behavior to take into account the drift effects inherent in choice processes to create more accurate models for the dynamic context of real-world decision-making.

It should be appreciated that the disclosed systems and methods are configured to identify drift and account for drift effects inherent in choice processes to create more accurate models for the dynamic context of real-world decision-making. Conventionally, models ignore drift and assume that the environment is fixed and that there are constant utility differences between choice options. As such, the disclosed systems and methods employs a novel or unconventional approach to learn dynamic utility representations and contextual attributes by detecting drift while users make sequential decisions and then automatically regularizes choice options when drift is detected.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system to identify drift in a dynamic context of real-world decision-making, the system comprising:
   a user-computing device;
   at least one sensor communicatively coupled to the user-computing device, the at least one sensor captures data as an input signal for a temporal drift;
   a processor; and
   a non-transitory, processor-readable storage medium in communication with the processor, the non-transitory, processor-readable storage medium comprising one or more programming instructions that, when executed, cause the processor to:
   display, on the user-computing device, a plurality of items in a spatial layout that a user may choose for a predetermined duration and at a predetermined frequency;
   monitor, via the at least one sensor, an eye gaze of the user while making sequential decisions about the plurality of items;
   determine that a drift has occurred;
   automatically regularize a plurality of alternative choice options when drift is detected;
   learn and identify an upper boundary and a lower boundary based on whether the user chooses or rejects at least one alternative choice of the plurality of alternative choice options;
   model the drift using machine learning based at least in part on a history of user decision responses;
   predict a drift direction of the drift and a relevance impact of different attributes into drift states;
   classify the drift states into a risk-averse classification and a risk-seeking classification by clustering drift parameters over different behavioral measures to learn an attentive drift of the user; and
   output a desirable behavior model for machine learning, wherein the prediction of the drift states, the classifying of the drift states, and the modeling of the drift provide data for training the desirable behavior model for machine learning.

2. The system of claim 1, wherein the machine learning is a recurrent neural networks Gaussian process.

3. The system of claim 1, wherein the determination of drift occurring is by additive Gaussian terms of drift signals from a plurality of sources.

4. The system of claim 3, wherein the additive Gaussian terms choose different kernels according to a type of input data.

5. The system of claim 1, wherein the at least one alternative choice of the plurality of alternative choice options includes a decision directed to whether the user decides to purchase or not to purchase a particular item of the plurality of items.

6. The system of claim 1, wherein the at least one sensor is an image capturing device.

7. The system of claim 1, wherein the at least one sensor is a plurality of sensors comprising a touch sensor or a motion sensor.

8. The system of claim 7, wherein the at least one sensor is configured to determine a plurality of mouse movements to learn the attentive drift.

9. The system of claim 1, wherein a duration of frequency of the displayed plurality of items is used as a second input signal for temporal drift.

10. The system of claim 1, wherein the different behavioral measures are a plurality of gaze patterns sensed by the at least one sensor.

11. A method to identify drift in a dynamic context of real-world decision-making, the method comprising:
receiving, from a user-computing device, a search query from a user;
providing, by a processor, a plurality of items in a spatial layout that the user may choose for a predetermined duration and at a predetermined frequency based on a plurality of history drift data for the user;
displaying, on the user-computing device, the plurality of items in the spatial layout for the predetermined duration and at the predetermined frequency;
monitoring, by the processor via at least one sensor, an eye gaze of the user while making sequential decisions about the plurality of items;
determining, by the processor, that a drift has occurred;
regularizing, by the processor, a plurality of alternative choice options when drift is detected;
learning and identifying, by the processor, an upper boundary and a lower boundary based on whether the user chooses or rejects at least one alternative choice of the plurality of alternative choice options;
modeling, by the processor, the drift using machine learning based at least in part on a history of user decision responses;
predicting, by the processor, a drift direction of the drift and a relevance impact of different attributes into drift states;
classifying, by the processor, the drift states into a risk-averse classification and a risk-seeking classification by clustering drift parameters over different behavioral measures; and
outputting, by the processor, a desirable behavior model for machine learning.

12. The method of claim 11, wherein the machine learning is a recurrent neural networks Gaussian process.

13. The method of claim 11, wherein the determination of drift occurring is by additive Gaussian terms of drift signals from a plurality of sources.

14. The method of claim 11, wherein the at least one alternative choice of the plurality of alternative choice options includes a decision directed to whether the user decides to purchase or not to purchase a particular item of the plurality of items.

15. The method of claim 11, wherein the at least one sensor is a plurality of sensors comprising an image capturing device, a touch sensor or a motion sensor.

16. The method of claim 15, wherein the at least one sensor is configured to determine a plurality of mouse movements to learn an attentive drift.

17. The method of claim 11, wherein a duration of frequency of the displayed plurality of items is used as an input signal for temporal drift.

18. The method of claim 11, wherein the different behavioral measures are a plurality of gaze patterns sensed by the at least one sensor.

19. A system to identify drift in a dynamic context of real-world decision-making, the system comprising:
a user-computing device;
at least one sensor communicatively coupled to the user-computing device, the at least one sensor captures data as an input signal for a temporal drift;
a processor; and
a non-transitory, processor-readable storage medium in communication with the processor, the non-transitory, processor-readable storage medium comprising one or more programming instructions that, when executed, cause the processor to: receive a search query from a user;
determine whether a plurality of history drift data for the user is available; when the plurality of history drift data for the user is available, provide a plurality of items in a spatial layout that the user may choose for a predetermined duration and at a predetermined frequency;
output for display on the user-computing device a plurality of items in a spatial layout that the user may choose for a predetermined duration and at a predetermined frequency;
monitor an eye gaze of the user while making sequential decisions about the plurality of items;
determine that a drift has occurred;
regularize a plurality of alternative choice options when drift is detected;
learn and identify an upper boundary and a lower boundary based on whether the user chooses or rejects at least one alternative choice of the plurality of alternative choice options;
model the drift using machine learning based at least in part on a history of user decision responses;
predict a drift direction of the drift and a relevance impact of different attributes into drift states;
classify the drift states into a risk-averse classification and a risk-seeking classification by clustering drift parameters over different behavioral measures to learn an attentive drift of the user; and
output a desirable behavior model for machine learning,
wherein the prediction of the drift states, the classifying of the drift states, and the modeling of the drift provide data for training the desirable behavior model for machine learning.

20. The system of claim 19, wherein:
when the plurality of history drift data for the user is not available, providing, by the processor, a default set of choice questions; and
prompting, by the user-computing device, the default set of choice questions for the user to select options therefrom; and
creating, by the processor, default choices based on the user selections,
wherein each default choice is assumed to have a same utility for the user.

* * * * *